United States Patent [19]

Pouring

[11] Patent Number: 4,681,072
[45] Date of Patent: Jul. 21, 1987

[54] METHOD AND APPARATUS FOR DISPOSAL OF TOXIC WASTES BY COMBUSTION

[75] Inventor: Andrew A. Pouring, Edgewater, Md.

[73] Assignee: Sonex Research, Inc., Annapolis, Md.

[21] Appl. No.: 802,189

[22] Filed: Nov. 25, 1985

[51] Int. Cl.⁴ .............................................. F02B 23/00
[52] U.S. Cl. ................................ 123/193 P; 123/1 A; 123/661
[58] Field of Search ................ 123/193 P, 661, 1 A

[56] References Cited

U.S. PATENT DOCUMENTS

| | | | |
|---|---|---|---|
| 2,281,598 | 5/1942 | Prutton . | |
| 3,890,950 | 6/1975 | Haldemann | 123/193 P |
| 3,906,924 | 9/1975 | Elsbett | 123/193 P |
| 3,984,206 | 10/1976 | Winnen | 165/128 |
| 4,036,772 | 7/1977 | Dorer, Jr. | 44/62 |
| 4,108,113 | 8/1978 | Timm et al. . | |
| 4,125,593 | 11/1978 | Scheifley et al. | 423/481 |
| 4,139,595 | 2/1979 | Vaseen | 423/400 |
| 4,154,811 | 5/1979 | Vona, Jr. et al. . | |
| 4,173,094 | 11/1979 | Nichols, Jr. | 44/79 |
| 4,209,983 | 1/1980 | Sokol | 60/413 |
| 4,240,802 | 12/1980 | Nichols, Jr. | 44/58 |
| 4,246,255 | 1/1981 | Grantham | 423/659 |
| 4,289,501 | 9/1981 | Medcalf | 44/56 |
| 4,400,936 | 8/1983 | Evans . | |
| 4,462,318 | 7/1984 | Carbeau et al. | 110/238 |
| 4,485,779 | 12/1984 | Spurk | 123/661 |
| 4,520,741 | 6/1985 | Carbeau et al. | 110/344 |
| 4,526,677 | 7/1985 | Grantham et al. | 210/262 |

*Primary Examiner*—E. Rollins Cross
*Attorney, Agent, or Firm*—Bacon & Thomas

[57] ABSTRACT

A method and apparatus for disposing of toxic waste materials by combustion in a modified piston type internal combustion engine is disclosed. The engine contains a combustion chamber which is divided into a variable volume primary chamber and a fixed volume secondary chamber, in which the combustion reaction occurs. The secondary chamber contains a source of carbon which enhances the combustion of the toxic waste materials.

13 Claims, 2 Drawing Figures

METHOD AND APPARATUS FOR DISPOSAL OF TOXIC WASTES BY COMBUSTION

BACKGROUND OF THE INVENTION

1. Field of Invention

This invention is directed to a method and apparatus for disposing of toxic waste materials, specifically halogenated hydrocarbons, by combustion in a modified piston type internal combustion engine.

2. Description of the Prior Art

The traditional method of using selected landfill sites to dispose of hazardous materials has come under serious review at both local and national levels since the environmental impact of recent episodes such as that which occurred at Love Canal. The instability of long term, safe, underground storage of toxic wastes has made this technique, which annually disposes of 250 million tons of waste, a questionable solution to the nation's toxic waste management problem. The hydrological interaction of waste materials stored in pits, lagoons, or deep wells with the underground water table; the bioconversion of stored materials; and the potential leakage of these materials are but a few of the major problems which will require expensive perpetual monitoring of such sites. For example, at 50 of the nation's 800 toxic waste wells, system failures have been experienced and reported, and nearly half of the 508 dump sites have also experienced irreversible failures, i.e., leakage of waste material into underground water supplies.

Incineration systems, biological treatment, and chemical neutralization are but a few of the technologies being actively pursued as alternatives to achieve an acceptable destruction and removal efficieny (DRE) of toxic waste materials while eliminating the problems associated with burial. Combustion of hazardous waste has been chiefly via incineration, rotary kilns, or coincineration. An example of an incineration system is disclosed in U.S. Pat. No. 4,462,318.

Liquid injection incinerators, designed for meeting DRE, have been built for specific pumpable liquids, but poor operational records, emission levels of PCB, fly ash, and health safety have clouded the potential success of this technology. Incineration at sea using liquid injection incinerators additionally faces environmental questions of potential spills and long-term ability of the ocean to absorb the emitted combustion effluent. Coincineration in existing systems, in addition to being less efficient, produces significant corrosion and a reduction in the reliability of the incineration system.

The Environmental Protection Agency has determined that the liquids found in a majority of abandoned dump sites consist chiefly of toluene, benzene, and chloroform. In addition, 25 compounds were found to account for more than two-thirds of the observed material, including 11 chlorinated hydrocarbons, 4 hydrocarbons and 7 heavy metal elements. Chlorinated hydrocarbons are a major part of most toxic wastes and are found in PCB's, pesticides, herbicides, and even Agent Orange. The ability to destructively degrade gaseous and liquid hydrocarbons by efficient, safe combustion would be a major contribution to the removal of these toxic wastes from the environment.

Methods have been proposed to burn toxic waste materials, including PCB's, in diesel engines. U.S. Pat. No. 4,108,113 describes a process in which waste vapors are mixed with air, introduced into the combustion chamber of a diesel engine, compressed and combusted at the end of the compression stroke by introducing a diesel fuel into the chamber. U.S. Pat. No. 4,154,811 and 4,400,396 disclose similar processes for liquid waste materials, particularly PCB's. Each of these various processes require that a substantial amount of diesel fuel be employed to effect combustion in the combustion chamber of the engine. In addition, in most cases, supplemental treatments of the exhaust gases from the combustion chamber are necessary to insure satisfactory removal of non-combusted toxic materials.

While the prior art methods have achieved some success in disposing of toxic substances, there remains a need in the art for a method of disposing of toxic substances, particularly halogenated hydrocarbons, which achieves substantially complete disposal of these substances in a more efficient manner than heretofore proposed.

SUMMARY OF THE INVENTION

Accordingly, it is an object of the present invention to provide a method and apparatus which effectively disposes of toxic waste materials, specifically halogenated hydrocarbons, by reacting these compounds in a modified piston type internal combustion engine, to produce carbon dioxide, water and hydrohalic acid, while generating power. The hydrohalic acid, which will be hydrochloric acid in the case of chlorinated hydrocarbons, may be recovered as a useful by-product of the method.

The invention achieves these and other objects and advantages by providing a method and apparatus for disposing of halogenated hydrocarbon compounds in a modified piston type internal combustion engine.

In the method of the invention, a mixture of at least one halogenated hydrocarbon compound and air is introduced into the combustion chamber of a modified piston type internal combustion engine. The proportion of air to halogenated hydrocarbon in the mixture is controlled to provide a sufficient amount of air to produce an oxidizable vapor phase mixture. The combustion chamber of the internal combustion engine into which the mixture is introduced, contains a variable volume primary chamber and a fixed volume secondary chamber. These two chambers are connected by a passageway which permits pressure gradients to be transmitted therebetween while shielding the secondary chamber from the high temperatures attained in the primary chamber. The secondary chamber contains a source of carbon, such as a graphite surface or coating, on at least a portion of the walls which define this chamber.

The vapor phase mixture which is introduced into the combustion chamber is compressed and heated by reducing the volume of the variable volume primary chamber. The compressed mixture is then ignited and burned in the combustion chamber and the combustion reaction products, composed primarily of carbon dioxide, water and hydrohalic acid, are discharged from the chamber.

The apparatus of the invention comprises an internal combustion engine having a piston movable within a cylinder, forming a variable volume primary chamber between the working face of the piston and the head of the cylinder, as is standard in piston type internal combustion engines. However, unlike standard piston type internal combustion engines, the apparatus of the invention contains a fixed volume secondary chamber, located below the working face of the piston and containing a source of carbon therein. The primary and secondary chambers are connected by a passageway which permits pressure gradients to be transmitted therebetween while shielding the secondary chamber from the high temperatures attained in the primary chamber. The apparatus further contains means for introducing the mixture of halogenated hydrocarbon and air to be combusted into the combustion chamber, means for igniting and burning the mixture in the chamber and means for discharging the combustion products from the chamber.

Further details of the method and apparatus of the invention are provided in the detailed description which follows.

BRIEF DESCRIPTION OF THE FIGURES OF DRAWING

DETAILED DESCRIPTION OF THE PREFERRED EMBODIMENTS

Figure 1:
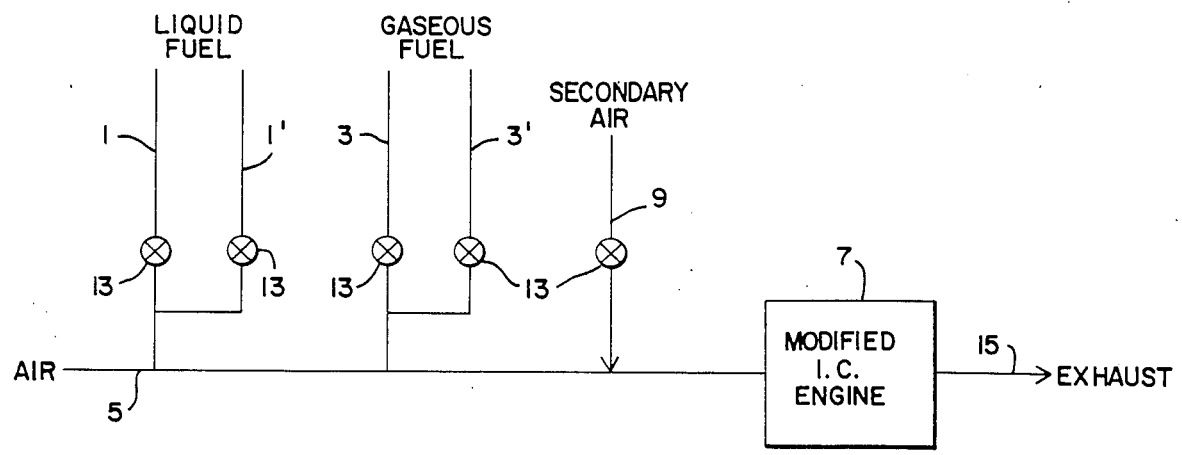
FIG. 1 is a schematic illustration of the invention.

Referring to FIG. 1, a system designed in accordance with the invention is illustrated schematically. As is evident from this figure, the invention is adapted to dispose of both liquid and gaseous wastes. The liquid or gaseous waste materials are directed to the system from holding tanks (not shown) through lines 1 and 3, respectively to air line 5, where they are mixed with air in the proper proportion to provide a fuel/air mixture which will be fully oxidizable in the vapor phase. Alternatively, the waste materials can be transported directly from the point where they produced without storage. A vapor phase mixture is immediately formed when gaseous waste is injected into the air stream. The liquid waste is initially entrained in the air but vaporizes before it is injected into the internal combustion engine 7. A secondary air line 9 is, preferably, provided to adjust the air/fuel ratio to the appropriate level, if necessary. Finally, supplemental liquid and gas fuels may be introduced into the liquid and gas lines 1 and 3, respectively, through lines 1' and 3'. Propane is a particularly preferred supplemental fuel which enters through supplemental line 3'. Valves 13 control the various lines for supplying fuel and secondary air to the system.

The toxic waste material provides the primary fuel for the internal combustion engine. The air/fuel mixture is introduced into internal combustion engine 7 where it is burned to produce combustion reaction products, i.e., carbon dioxide, water and hydrohalic acid with minimal residual toxic material. However, with some toxic waste materials it may be necessary to add a supplemental fuel or carrier, such as propane, to the air/fuel mixture to insure complete combustion. Alternatively, the supplemental fuel may be another toxic waste material which is more readily combusted than the toxic waste material serving as the primary fuel. The amount of supplemental fuel required will depend upon the particular toxic waste material serving as the primary fuel. However, as its name implies, the supplemental fuel only serves to supplement the combustion reaction and will not be added in an amount which is sufficient to sustain engine operation by itself.

The combustion reaction products are exhausted from the internal combustion engine through line 15. The hydrohalic acid is preferably recovered from the exhaust stream by scrubbing or any other known method. The remaining combustion reaction products may be discharged directly to the atmosphere so long as the residual level of toxic waste material is below the accepted standards. Otherwise, further processing is necessary to reduce the residual toxic waste content of the exhaust to acceptable levels.

Figure 2:
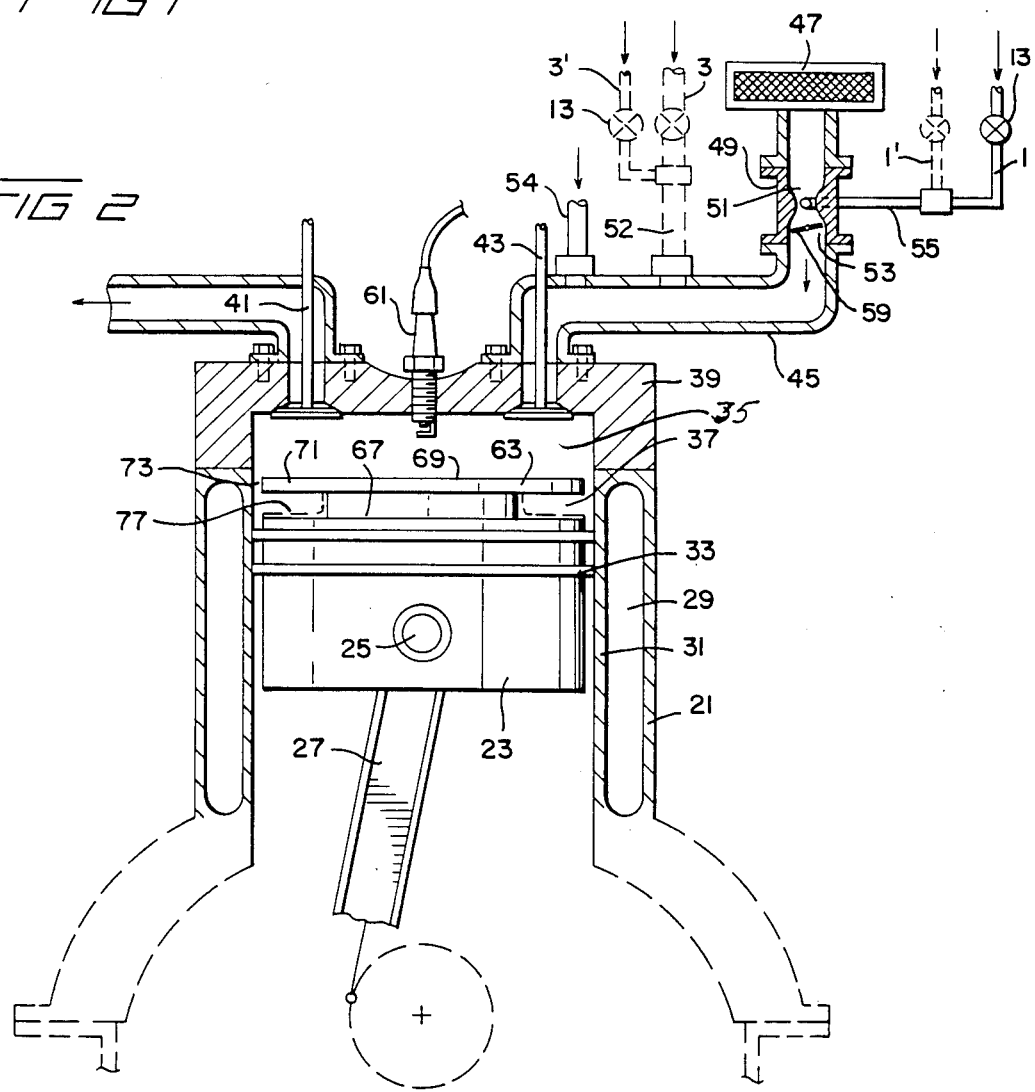
FIG. 2 is an illustration of an embodiment of the modified piston internal combustion engine used in the apparatus of the invention.

FIG. 2 provides a detailed illustration of the combustion chamber of the modified piston type internal combustion engine of the invention. An engine housing or block 21 forms a chamber for reciprocating piston 23 that is attached by means of wrist pin 25 to connecting rod 27. The engine housing may include water jacket 29 therein. A crankshaft (not shown) is coupled to connecting rod 27 by means of a journal bearing to permit reciprocating motion of piston 23 to be transformed into rotating mechanical energy that may be utilized to drive machinery for providing work output.

The inner wall of housing 21, adjacent the wall of piston 23, forms a cylinder wall 31 that is in contact with rings 33 to provide a gas pressure tight seal between reciprocating piston 23 and cylinder wall 31 to prevent the escape of high pressure gases generated by burning fuel in variable volume primary chamber 35 and fixed volume secondary chamber 37, which together form the combustion chamber of the internal combustion engine. Attached to engine housing 21 is cylinder head 39 which encloses the combustion chamber. Cylinder head 39 has two ports, exhaust and intake, that open and close by means of exhaust valve 41 and intake valve 43, respectively. These valves are opened and closed in time sequence with the reciprocating movement of the piston by means of valve lifters, push rods, camshafts and the like (not shown).

Attached to cylinder head 39, is an intake manifold 45, that forms a closed passageway for allowing the flow of fuel and atmospheric air to the combustion chamber. An air filter 47 is provided to filter air entering a carburetor like device 49 through venturi 51, that has nozzle or port 53 attached to liquid fuel line 55. Air flowing through venturi 51 creates a vacuum to draw liquid fuel from fuel line 55 into the combustion chamber when intake valve 43 is opened. The carburetor like device 49 may be replaced by other fuel delivery systems, such as fuel injectors or like devices known to those of skill in the art. A throttle valve 59 attached to a linkage arrangement (now shown) controls the amount of vacuum through venturi 51 by restricting air flow through the venturi for controlling the amount of fuel delivered to the engine.

Gaseous fuel enters intake manifold 45 through line 52 where it readily mixes with air to form a vapor phase air/fuel mixture. The gaseous fuel may be a toxic waste material, a supplemental fuel, such as propane, or a mixture of toxic waste material and supplemental fuel.

Secondary air enters intake manifold 45 through air line 54. The amount of secondary air, if any, added to the combustion chamber through line 54 will depend upon the fuel being combusted in the chamber. The addition of secondary air is particularly important in insuring proper combustion of liquid waste materials.

A spark plug 61 is attached in cylinder head 39 in a conventional manner and operates to deliver an electric voltage to create a spark in the combustion chamber in proper timing sequence with other engine elements to ignite and burn the fuel in the combustion chamber thereby disposing of the toxic waste material and creating power to drive piston 23. In the embodiment shown in FIG. 2, the spark plug 61 is disposed at the top of the primary chamber 35 of the combustion chamber so that combustion is initiated in the primary chamber and rapidly spreads throughout this chamber and into the secondary chamber 37 through passageway 73. It is to be noted that the spark plug 61 is shown in FIG. 2 as being disposed at the top of the combustion chamber. However, other configurations in which the spark plug is disposed in the side of the chamber, as well as configurations which do not require a spark plug at all for ignition, are contemplated as being within the scope of the invention.

A cap like element 63 is centrally attached to piston 23 by means of a rivet, bolt or like fastener. Alternatively, the cap like element may be formed integral with the piston. The cap like element 63 is T-shaped with a generally cylindrical stalk 67 connecting a working face 69 to the piston 23. The working face 69 is provided by a generally flat circular member which is integral with or connected to stalk 67 and includes a radially extending lip portion 71 having a periphery that is spaced apart from cylinder wall 31, forming passageway 73. The remaining exposed portion of piston 23, stalk 67 and the underside of lip 71, form fixed volume secondary chamber 37. This chamber communicates with the variable volume primary chamber 35 through passageway 73.

As shown in FIG. 2, the secondary chamber is disposed around the entire circumference of stalk 67. However, in other embodiments of the invention, this chamber need extend only partially around the circumference, in which case a portion of stalk 67 would extend outward filling the gap between the underside of lip 71 and piston 23 along a portion of the circumference of the piston.

At least a portion of the elements which form the secondary chamber are provided with graphite 77. The graphite can be provided as a structural part of the secondary chamber, i.e., stalk 67, or as a coating on the parts of the chamber as shown in FIG. 2. The presence of carbon, preferably in the form of a graphite, is an important element in providing complete combustion of the toxic waste fuel. While not intending to be bound by theory, it is believed that the carbon in the secondary chamber facilitates cracking of higher molecular weight fuels thereby providing more complete combustion of these fuels.

The apparatus of the invention is useful in disposing of a variety of toxic waste materials, liquid and gas. In particular, halogenated hydrocarbon compounds can be burned to combustion reaction products, i.e., carbon dioxide, water and hydrohalic acid, with minimal residual non-combusted toxic material. Exemplary of these compounds are halogenated derivatives of aliphatic hydrocarbons such as vinyl chloride, vinylidene chloride, methyl chloride, ethyl chloride, dichloromethane, dichlorethane, dichlorethylene, etc., and of aromatic hydrocarbons such as chlorobenzene, dichlorobenzene, etc. Of course, it is understood that these compounds are cited as examples and are not intended to limit the scope of the invention which is considered applicable to all halogenated hydrocarbon compounds which can be mixed with air to form an oxidizable vapor phase mixture.

In practicing the invention, the halogenated hydrocarbon is fed to the internal combustion engine as fuel, where it is mixed with a sufficient amount of air to form a vapor phase oxidizable mixture. Generally, air/fuel ratios from stoichiometric to lean mixtures will provide this type of mixture. Of course, the optimum air/fuel ratio will vary with each fuel but can be determined with routine experimentation. The vapor phase mixture is formed in the intake manifold 45 of the internal combustion engine, as previously described with regard to FIG. 2, and introduced into the combustion chamber through intake valve 43. As the mixture is introduced into the combustion chamber it is compressed by action of piston 23 which moves upwards in cylinder 31, thereby reducing the volume of variable volume chamber 35. As compression occurs, the air/fuel mixture is heated and distributed throughout the primary chamber 35 and through passageway 73 into the fixed volume secondary chamber 37. At the appropriate time, spark plug 61 is activated and generates a spark which ignites and burns the fuel in both the primary and secondary chambers. In this embodiment, combustion begins in the primary chamber but rapidly spreads to the secondary chamber which is shielded from the high temperatures attained in the primary chamber during combustion by virtue of lip 71. The energy generated by the combustion reaction forces piston 23 downwards in cylinder 31, rotating the crankshaft, thereby transforming the chemical energy produced by the combustion reaction into mechanical energy. The combustion reaction products are discharged from the combustion chamber through exhaust valve 41.

As previously stated, the combustion reaction products exhausted from the engine contain minimal amounts of residual halogenated hydrocarbons. Thus, the method and apparatus of the invention provide the dual benefits of disposing of toxic waste materials and generating power to run machinery or generate electricity. To illustrate the various advantages of the invention described above, the following examples are provided, it being understood that their purpose is entirely illustrative and is in no way intended to limit the scope of the invention.

EXAMPLE I

A Megatech Mark III single cylinder spark ignited, four stroke glass engine was used to test the ability of the invention to completely burn gaseous and liquid chlorinated hydrocarbons and produce power as a by-product. The engine was modified by applying a stem and cap assembly on the piston engine as shown in FIG. 2, to provide a variable volume primary chamber and fixed volume secondary chamber. The engine had a 3 to 1 compression ratio. Also, it was air-cooled and designed using low friction self-lubricating Teflon rings which permit the engine to be operated oil-free. The Pyrex glass cylinder easily allows optical observations of flame color and shape, as well as the quality of ignition.

Two constant engine speeds were used during testing. The speeds of 1000 rpm (the lowest possible for sustained operation) and 1500 rpm were selected.

Engine loading and control were by means of a Megatech Model DG-1 engine dynamometer/generator. By electrically loading the engine, testing to complete combustion was accomplished at constant engine speed. Dynamometer instrumentation included rheostat load control, generated current and voltage meters, and cooling air supply pressure gauges, maintained at 15 psig for all tests.

Airflow rate measurements were obtained using a rotometer calibrated in standard cubic feet per hour. The rotometer was connected to a plenum which was connected to the engine intake manifold. Additional rotometers were used to meter the amount of chlorinated hydrocarbon fuel, gaseous and liquid, and, in some cases, supplemental fuel (propane) metered to the engine through separate supply lines to the intake manifold.

A digital thermometer using K-type thermocouples was used to monitor ambient air temperature, gaseous fuel supply line temperature, time averaged in-cylinder gas temperature and engine exhaust temperature.

A standard or "stock" piston engine was tested in conjunction with the "modified" piston engine of the invention to provide comparative data.

Exhaust samples were collected for quantitative analysis by means of a sampling train consisting of an electrically heated probe and mixing plenum, a fiberglass filter for particulates, a sorbant tube containing a porous polymer such as Porapak Q, and a calibrated volumetric syringe for drawing a metered sample volume at a measured temperature.

The uncombusted halogenated compound that remained as a residual exhaust gas constituent was collected on the absorbent and was subsequently desorbed directly into a gas chromatograph. Detection was by a Coulson electrolyte conductivity detector, which is selective for chlorinated organic compounds. Calibration was by injecting measured amounts of each test compound (diluted with an appropriate unhalogenated solvent) onto the absorbent polymer, followed by the same sequence of thermal desorption and detection.

Five chlorinated hydrocarbon compounds, 1,2-dichloroethane ($C_2H_4Cl_2$), 1,2-dichlorobenzene ($C_6H_4Cl_2$), 2-chloropropane ($C_3H_7Cl$), monochlorobenzene ($C_6H_5Cl$) and ethyl chloride ($C_2H_5Cl$), were employed as the primary fuel in the engines.

The quantitative results of tests on these chlorinated hydrocarbon fuels using gas chromatography are provided in Table 1:

TABLE I

Results of Gas Chromatographic Tests Stock-Modified

| Run | A | B | C | D | E | F | G | H |
|---|---|---|---|---|---|---|---|---|
| RPM | 1500 | 1000 | 1500 | 1000 | 1000 | 1500 | 1000 | 1500 |
| Piston | stock | stock | modified | modified | modified | modified | modified | modified |
| Fuel | $C_2H_4Cl_2$ | $C_2H_4Cl_2$ | $C_2H_4Cl_2$ | $C_2H_4Cl_2$ | $C_2H_4Cl_2$ | $C_2H_4Cl_2$ | $C_6H_4Cl_2$ | $C_6H_4Cl_2$ |
| Fuel (%) | 58.200 | 79.900 | 57.900 | 79.600 | 79.900 | 62.200 | 66.000 | 89.400 |
| Supplemental fuel (propane) (%) | 41.800 | 20.100 | 42.100 | 20.400 | 20.100 | 37.800 | 34.000 | 10.600 |
| AF (lbm air/fuel) | 4.235 | 3.476 | 4.284 | 3.704 | 3.902 | 3.890 | 11.860 | 9.830 |
| T air (°F.) | 74 | 74 | 65 | 69 | 68 | 73 | 76 | 76 |
| T engine (°F.) | 435 | 381 | 390 | 395 | 347 | 424 | 408 | 434 |
| T exhaust (°F.) | 848 | 698 | 910 | 768 | 797 | 928 | 586 | 860 |
| Torque (in-lbf) | 5.000 | 6.800 | 2.200 | 3.800 | 3.000 | 3.500 | 6.000 | 5.000 |
| Power (W) | 63.000 | 48.000 | 35.000 | 29.250 | 29.250 | 58.500 | 48.000 | 55.250 |
| Residual (%) | 1.504 | 1.261 | 1.177 | 0.709 | 1.114 | 1.261 | 2.550 | 2.460 |

| Run | I | J | K | L | M | N | O | P |
|---|---|---|---|---|---|---|---|---|
| RPM | 1000 | 1500 | 1000 | 1500 | 1000 | 1500 | 1000 | 1500 |
| Piston | modified | modified | stock | stock | stock | stock | modified | modified |
| Fuel | $C_6H_4Cl_2$ | $C_6H_4Cl_2$ | $C_6H_4Cl_2$ | $C_6H_4Cl_2$ | $C_3H_7Cl$ | $C_3H_7Cl$ | $C_3H_7Cl$ | $C_3H_7Cl$ |
| Fuel (%) | 57.400 | 83.500 | 66.000 | 89.400 | 100.000 | 100.000 | 100.000 | 100.000 |
| Supplemental fuel (propane) (%) | 42.600 | 16.500 | 34.000 | 10.600 | 0 | 0 | 0 | 0 |
| AF (lbm air/fuel) | 14.560 | 11.590 | 7.180 | 9.520 | 5.745 | 6.284 | 5.918 | 6.527 |
| T air (°F.) | 64 | 68 | 71 | 73 | 75 | 76 | 68 | 69 |
| T engine (°F.) | 439 | 401 | 441 | 468 | 403 | 445 | 391 | 437 |
| T exhaust (°F.) | 610 | 833 | 630 | 862 | 621 | 818 | 689 | 856 |
| Torque (in-lbf) | 4.000 | 2.300 | 8.800 | 6.500 | 9.000 | 6.000 | 6.000 | 5.500 |
| Power (W) | 31.500 | 41.250 | 75.000 | 68.250 | 84.000 | 75.000 | 58.500 | 78.750 |
| Residual (%) | 2.180 | 4.610 | 5.470 | 4.530 | 0.403 | 0.181 | 0.150 | 0.165 |

| Run # | Q | R | S | T | U | V | W |
|---|---|---|---|---|---|---|---|
| RPM | 1000 | 1500 | 1000 | 1000 | 1000 | 1000 | 1000 |
| Piston | modified | modified | stock | modified | modified | modified | stock |
| Fuel | $C_3H_7Cl$ | $C_3H_7Cl$ | $C_6H_5Cl$ | $C_6H_5Cl$ | $C_6H_5Cl$ | $C_2H_5Cl$ | $C_2H_5Cl$ |
| Fuel (%) | 100.000 | 100.000 | 50.000 | 48.000 | 52.000 | 93.200 | 93.200 |
| Supplemental fuel (propane) (%) | 0 | 0 | 50.000 | 52.000 | 48.000 | 6.800 | 6.800 |
| AF (lbm air/fuel) | 5.464 | 9.854 | 9.520 | 10.000 | 9.230 | 7.110 | 7.110 |
| T air (°F.) | 71 | 73 | 78 | 68 | 69 | 75 | 77 |
| T engine (°F.) | 407 | 491 | 365 | 334 | 406 | 395 | 428 |
| T exhaust (°F.) | 686 | 877 | 629 | 572 | 567 | 524 | 637 |
| Torque (in-lbf) | 7.000 | 2.500 | 6.400 | 3.300 | 5.500 | 7.000 | 8.000 |
| Power (W) | 58.500 | 48.000 | 55.250 | 37.500 | 48.000 | 55.250 | 75.000 |
| Residual (%) | 0.176 | 0.235 | 1.066 | 1.249 | 0.817 | 0.324 | 1.182 |

The results of the tests show that the use of the modified piston internal combustion engine reduced unburned residuals to a greater degree than the stock piston engine, for both chlorinated aliphatic and chlorinated aromatic compounds. Also, the combustion energy achieved by the modified piston engine was in all cases sufficient to drive the dynamometer to generate electrical power.

EXAMPLE II

To demonstrate the importance of the carbon provided in the secondary chamber of the modified piston in the apparatus of the invention, gaseous (ethyl chloride) and a liquid (2-chloropropane) compounds were run as the fuel in a stock engine designed employing a standard aluminum piston and in the modified piston engine designed in accordance with the invention. The results of this test for the modified piston engine are provided in Table 2:

TABLE 2

Residual Waste With and Without Graphite

| Gaseous Compound | | $C_2H_5Cl$ | | % |
|---|---|---|---|---|
| Run | With Graphite | Run | Without Graphite | Comparative Residual |
| A | 1.5 | C | 2.6 | 73.3 |
| B | 2.2 | D | 3.4 | 54.4 |

| Liquid Compound | | $C_3H_7Cl$ | | % |
|---|---|---|---|---|
| Run | With Graphite | Run | Without Graphite | Comparative Residual |
| A | 2.2 | C | 3.7 | 68.2 |
| B | 17.0 | D | 21.1 | 24.1 |

Comparative Residual =
$$\frac{(\text{Residual w/o Graphite}) - (\text{Residual w/Graphite})}{\text{Residual with Graphite}} \times 100\%$$

Based upon the results of this test it is evident that the presence of carbon in the secondary chamber contributes to the reduction of unburned residuals.

While the present invention has now been described in terms of certain preferred embodiments and exemplified with respect thereto, one skilled in the art will readily appreciate that various modifications, changes, omissions and substitutions may be made without departing from the spirit thereof. It is intended, therefore, that the present invention be limited solely by the scope of the following claims.

What is claimed is:

1. A method for disposing of halogenated hydrocarbon compounds in a piston type internal combustion engine which comprises:
   (a) introducing a mixture comprised of at least one halogenated hydrocarbon compound and a sufficient amount of air to provide an oxidizable vapor phase mixture into a combustion chamber of a piston type internal combustion engine, said combustion chamber having a variable volume primary chamber and a fixed volume secondary chamber, said fixed volume secondary chamber communicating with said variable volume primary chamber through a passageway therebetween and said fixed volume secondary chamber containing a source of carbon therein;
   (b) compressing and heating said vapor phase mixture by reducing the volume of said variable volume primary chamber;
   (c) igniting and burning the vapor phase mixture in said combustion chamber; and
   (d) discharging the combustion reaction products from said combustion chamber.

2. The method of claim 1, wherein said variable volume primary chamber is located above the working face of the piston and said fixed volume secondary chamber is located below the working face of the piston.

3. The method of claim 1, wherein said source of carbon comprises a surface of graphite on at least a portion of the walls which define the secondary chamber.

4. The method of claim 1, wherein said halogenated hydrocarbon compound is selected from the group consisting of halogenated aliphatic and aromatic hydrocarbons and mixtures thereof.

5. The method of claim 4, wherein said halogenated hydrocarbon is a chlorinated hydrocarbon.

6. The method of claim 1, wherein said mixture comprises a supplemental fuel.

7. The method of claim 6, wherein said supplemental fuel is propane.

8. The method of claim 1, further comprising:
   (e) separating and recovering hydrohalic acid from the combustion reaction products discharged from the combustion chamber.

9. The method of claim 8, wherein said hydrohalic acid is hydrochloric acid.

10. An apparatus for disposing of halogenated hydrocarbon compounds comprising:
    (a) an internal combuston engine comprised of a piston movable within a cylinder, forming a variable volume primary chamber between the working face of the piston and the head of the cylinder, a fixed volume secondary chamber located below the working face of the piston containing a source of carbon, and a passageway between the primary and secondary chambers;
    (b) means for introducing a mixture comprised of at least one halogenated hydrocarbon compound and a sufficient amount of air to provide an oxidizable vapor phase mixture into the primary chamber;
    (c) means for igniting and burning said vapor phase mixture in said primary and secondary chambers; and
    (d) means for discharging the combustion reaction products from said primary and secondary chambers.

11. The apparatus of claim 10, wherein said piston includes a reciprocating piston element and a member on top of the piston element extending towards the cylinder head forming the working face of the piston, said member including a radially extending lip portion spaced from and extending along the wall of the cylinder and spaced above the piston element, said secondary chamber occupying the area between said lip and the piston element.

12. The apparatus of claim 11, wherein said source of carbon comprises a surface of graphite on at least a portion of the lip and/or the piston element which defines the secondary chamber.

13. The apparatus of claim 10, wherein said means for igniting and burning said vapor phase mixture is a spark plug located in the head of the cylinder.

* * * * *